Patented Oct. 30, 1928.

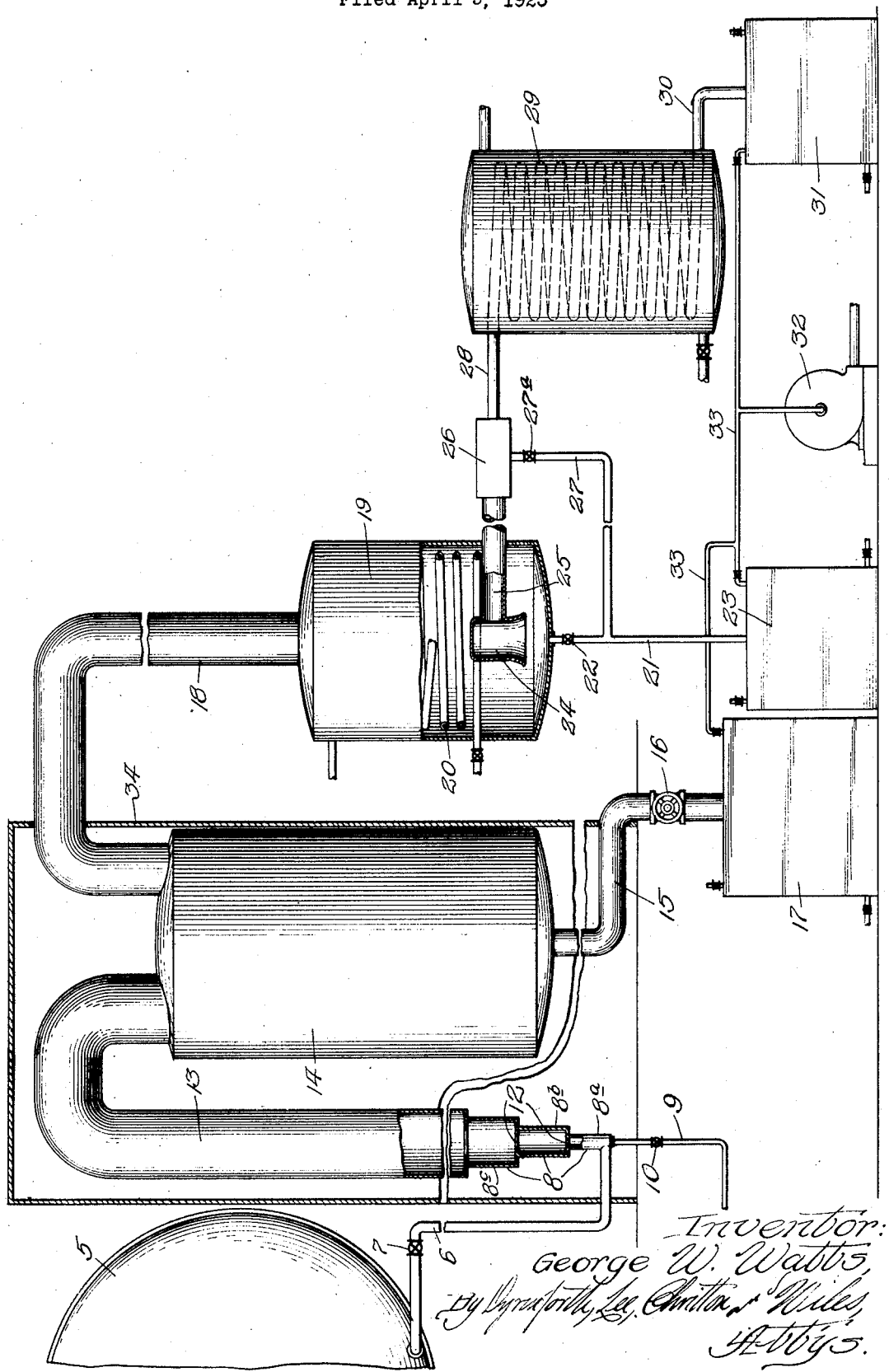

1,689,606

UNITED STATES PATENT OFFICE.

GEORGE W. WATTS, OF WHITING, INDIANA, ASSIGNOR TO STANDARD OIL COMPANY, OF WHITING, INDIANA, A CORPORATION OF INDIANA.

ART OF DISTILLATION.

Application filed April 3, 1925. Serial No. 20,415.

The present invention relates to improvements in the art of distillation, and more particularly to the continuous distillation of heavy hydrocarbon oils, such as the heavy residues from the continuous fire and steam distillation of mid-continent oils, and oils of similar character. It will be fully understood from the following description illustrated by the accompanying drawing, in which apparatus suitable for carrying out the invention is diagrammatically shown, partly in section.

Referring more particularly to the drawings, the numeral 5 indicates the end still of a battery of continuous fire and steam stills, from which the residue is discharged through a line 6 controlled by valve 7. The hot oil from the continuous stills (or from any suitable heating device) is led to a mixing device 8, into which superheated steam is introduced through the pipe 9 controlled by valve 10. The steam thus introduced, which may suitably be at atmospheric pressure, aids the introduction of the oil by aspirator or injector action, and atomizes or sprays the oil.

As illustrated the mixing device may consist of a succession of short cylindrical members, each larger than the preceding one, connected by openings 12 somewhat smaller in area than the cross-section of the preceding cylindrical member. This succession of cylindrical members and openings acts as a mixer for the superheated steam and the entering oil. From the mixer, the mixture of oil and vapors, including the steam, enters a large tube or conduit 13, in which the liquids and vapors are brought to a temperature equilibrium. The temperature of the superheated steam supplied through the pipe 9 is sufficient to supply the necessary heat for vaporization of the oil and to bring the entire mass of unavaporized liquid and vapors to equilibrium at a determined temperature, say 700 to 750° F. The tube 13 opens into an enlarged chamber 14, which serves primarily as a chamber for separation of unvaporized oil and vapors, although to some extent, the attainment of an equilibrium temperature condition may take place therein. In general, however, substantial equilibrium is attained in the conduit 13 leading to chamber 14. Unvaporized or reisdue oil is discharged from the separating chamber 14 through a line 15 controlled by valve 16 into the receiver 17.

From the separating chamber 14, vapors pass out through the line 18 to a condensing chamber 19, in which they are cooled by a suitable cooling medium, such as water, passing through the coil 20. Condensate formed in the condensing chamber 18 passes out through the line 21 controlled by valve 22 into the receptacle 23. The temperature within the condensing chamber is so controlled by the passage of the cooling medium through the coil 20 that substantially all of the oil vapors are condensed therein, the steam passing out through a vapor collector 24 and a vapor discharge pipe 25. A trap 26 interposed in this pipe removes entrained oil, which is discharged through the line 27 controlled by valve 27$^a$ into the line 21 leading to the receptacle 23. Uncondensed steam passes from the trap 26 to the line 28 to and through the condenser coil 29, the condensed steam being discharged through line 30 into the receiver 31.

Each of the receivers 17, 23 and 31 is connected to a vacuum pump 32, the lines 33 being employed for this purpose.

The mixer 8, the equilibrium conduit 13 and the separating chamber 14 may be thermally insulated by means of a suitable housing 34, or by other suitable means as may be found convenient.

The entire system may suitably be maintained at an absolute pressure of 25 to 75 millimeters and the proportion of steam admixed with the oil may be such as to provide 2 to 10 pounds of steam per gallon of distillate oil produced.

The oil received from the last still 5 of the continuous battery of fire and steam stills or other suitable heating device enters the mixer 8 at substantially the temperature at which it leaves the battery of stills, say 680 to 750° F. The steam is supplied at substantially atmospheric pressure and at a temeperature of 900° to 1200° F. The rapid expansion of the steam as it passes through each orifice causes a corresponding reduction in temperature. The dimensions of the successive stages 8$^a$, 8$^b$ and 8$^c$ of the mixer and of the conduit 13 are preferably so calculated that the velocities of movement of the oil-vapor-steam mixture in each stage are approximately the same, and that there is substantially no pressure drop in the conduit 13. An equilibrium temperature of 700 to 750° F. or higher is attained in the equilibrium conduit 13 and the separating chamber 14. The rate of movement of the mixed vapor and liquid through the conduit is maintained in steady flow at a velocity of say 200 to 600 feet per second. A recovery of heat takes place in each stage of the mixer and in the conduit and aids in the vaporization of the desired proportions of the oil. The time of contact of the steam and oil in the equilibrium conduit 13 is very short, being much less than one second (say from 0.1 to 0.2 sec.). On reaching the separating chamber 14 the relatively quiescent state prevailing therein causes the unvaporized oil to be substantially completely deposited, this oil being discharged through the line 15 into the receiver 17. The oil vapors, together with the accompanying steam, pass through the line 18 into the condensing chamber 19, in which substantially all of the oil is condensed out. The steam continues on to the steam condenser 29, any entrained oil being trapped out at the trap 26 and conveyed to the receiver 23, together with condensate formed in the condensing chamber 20. When operating under the condition set forth above, from 70 to 80% of the residue from the continuous stills may be converted into an overhead, petrolatum-containing distillate, the remainder, amounting to from 3 to 5% on the original crude, being deposited as a tar or residuum in the separating chamber 14, and discharged therefrom into the receiver 17.

It is readily apparent that the present method and apparatus may be employed in connection with distillation with steam at atmospheric pressure or, if desired, at pressures above atmospheric. It will be obvious, of course, that in such cases the pressure under which the superheated steam is supplied, must be made proportionately higher. The temperature of the steam supplied and the difference in pressure between the point of its admission and the equilibrium conduit must be so proportioned with respect to the temperature of the entering oil and the relative proportions of steam and oil as to produce the desired equilibrium temperature.

It is also apparent that other inert gases than steam may be employed, for example, flue gas, $CO_2$, N, hydrocarbon vapors, etc.

I claim:

1. The method of distilling hydrocarbon oils wherein a stream of oil is introduced into a mixing device, steam is superheated and introduced into the mixing device while reducing its pressure, thereby causing an expansion of the steam simultaneously with the introduction of the oil, the steam supplying at least the heat required for vaporization of the desired proportion of the oil, the mixture of steam and oil is conveyed in constant flow through an externally unheated passage until substantially equilibrium conditions are attained at a predetermined temperature and pressure without separation, and the resulting liquids and vapors introduced into a chamber, from which the unvaporized liquids and vapors are separately withdrawn.

2. The method of distilling hydrocarbon oils wherein a stream of oil is introduced into a mixing device, steam is superheated and admixed with the oil and simultaneously the mixture expanded into an externally unheated passage at a lower pressure, the passage being of such dimensions that the rate of flow is substantially the same before entering and in the conduit, continuing the travel of the mixture through the passage at a substantially constant rate until substantial thermal equilibrium is attained, then reducing the velocity of movement of the mixture, thereby permitting separation of vapors and unvaporized liquids.

3. The method of distilling hydrocarbon oils which comprises thoroughly intermingling oil with super-heated steam in quantity adequate to supply heat for the vaporization of the desired proportion of the oil, simultaneously reducing the pressure upon the mixture, thereby expanding the steam and reducing its temperature, flowing the admixed steam and oil through a conduit at a substantially constant velocity of 200 to 600 feet per second without separation, and subsequently separating the vapors and unvaporized oils.

4. The method of distilling hydrocarbon oils which comprises thoroughly intermingling oil with super-heated steam in quantity adequate to supply heat for the vaporization of the desired proportion of the oil, simultaneously reducing the pressure upon the mixture, thereby expanding the steam and reducing its temperature to avoid cracking the constituents of the oil, flowing the admixed steam and oil through a conduit at a substantially constant velocity of 200 to 600 feet per second, thereby substantially attaining equilibrium, and reducing the velocity of flow of the mixture, thereby permitting separation of the vapors and unvaporized oils.

5. The method of distilling hydrocarbon oils wherein superheated steam is partially expanded and admixed with oil, the mixture of steam and oil passed through an orifice into an unheated passageway of larger cross sectional area than said orifice, the passageway being at reduced pressure, and the mixture caused to flow through said passageway without separation, a portion of the heat lost during expansion of the steam reverting to the mixture of oil and steam in the passageway and aiding in the vaporization of the oil.

6. In apparatus for distilling hydrocarbon oils, an expanding mixer, means for supplying superheated steam and oil separately to the mixer, an unheated conduit into which the mixer opens, said conduit being of length sufficient to permit the admixed oil and steam to come to substantial equilibrium, means at the end of the conduit separating vapors and unvaporized liquids, and means for maintaining the conduit at a pressure lower than that of the steam supplied.

7. In apparatus for distilling hydrocarbon oils, an expanding mixer, means for supplying superheated steam and oil separately to the mixer, an unheated conduit into which the mixer opens, said conduit being of length sufficient to permit the admixed oil and steam to come to substantial equilibrium, and means for maintaining the conduit at a pressure lower than that of the steam supplied, the mixer and conduit being proportioned to maintain the velocity of flow of the mixture substantially unchanged.

8. In apparatus for distilling hydrocarbon oils, an expanding mixer comprising successive stages, each of greater cross-sectional area than the preceding, orifices between adjacent sections of less cross-sectional area than the larger thereof, the last section being extended to form a conduit, means for supplying superheated steam and oil to the first section of the mixer, and means for maintaining a vacuum in the conduit.

9. In apparatus for distilling hydrocarbon oils, an expanding mixer, means for supplying superheated steam and oil separately to the mixer, an unheated conduit into which the mixer opens, said conduit being of larger cross-sectional area than the mixer and of length sufficient to permit the admixed oil and steam to come to substantial equilibrium, means at the end of the conduit for separating vapors and unvaporized liquid, and means for maintaining in the conduit a velocity of the mixture sufficient to substantially prevent separation therein.

10. In apparatus for distilling hydrocarbon oils, an expanding mixer comprising successive stages, each of greater cross-sectional area than the preceding, orifices between adjacent sections of less cross-sectional area than the larger thereof, a conduit into which said mixer opens, means for supplying superheated steam and oil to the first section of the mixer, and means for maintaining a pressure differential through the mixer and conduit whereby a velocity is maintained in the latter sufficient to prevent separation therein.

GEORGE W. WATTS.